(No Model.)
H. W. LIBBEY.
STREET CAR SEAT.
No. 427,095. Patented May 6, 1890.
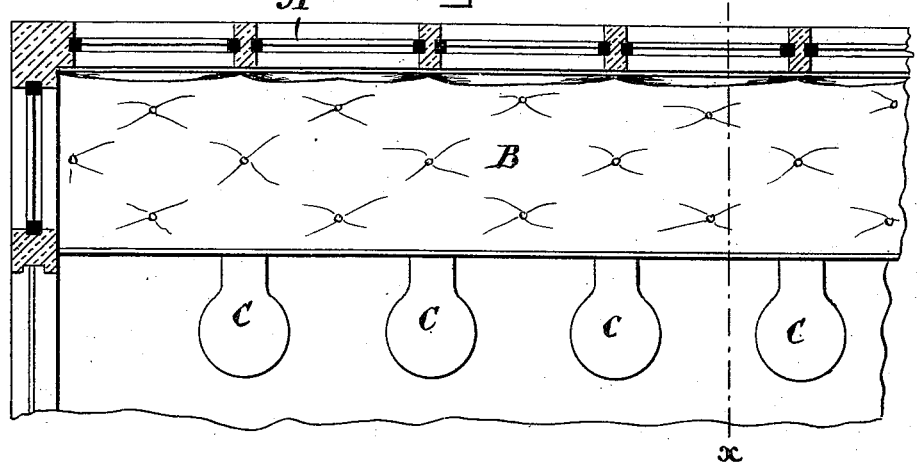
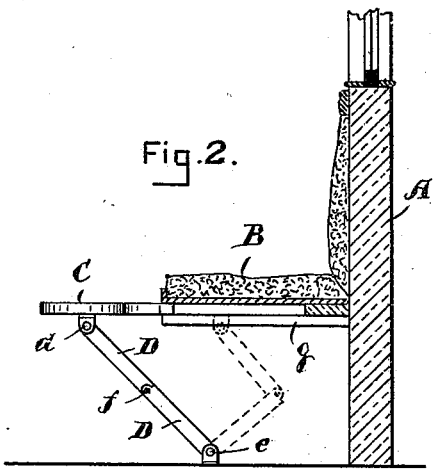
Witnesses.
J. George Seltzer
Lauritz Möller
Inventor.
Hosea W. Libbey
by Edwin Planta
Attorney.
THE NORRIS PETERS CO., PHOTO-LITHO., WASHINGTON, D. C.

UNITED STATES PATENT OFFICE.

HOSEA W. LIBBEY, OF BOSTON, MASSACHUSETTS.

STREET-CAR SEAT.

SPECIFICATION forming part of Letters Patent No. 427,095, dated May 6, 1890.

Application filed January 12, 1889. Serial No. 296,154. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Street-Car Seats, of which the following, taken in connection with the accompanying drawings, is a specification.

In street-cars the seats are often insufficient to accommodate the number of persons in the car, and consequently some of the passengers have to stand.

Now the object of my invention is to provide additional seats whereby nearly double the number of passengers can be seated than at present; and the invention consists of seats arranged at intervals and so as to slide under the ordinary seats, as hereinafter fully described and pointed out in the claims.

Referring to the accompanying drawings, Figure 1 represents a plan or top view of a portion of a car-seat provided with seats embodying my invention. Fig. 2 is a vertical transverse section taken on lines $x$ $x$ of Fig. 1, showing the additional seat adapted to slide beneath the ordinary seat when not required for use.

A represents a portion of a car, and B the seat.

C C are seats arranged at intervals along the front edge of the seat B, sufficient space being left between each for a passenger to sit upon the ordinary seat. Thus if the ordinary seat will accommodate twelve persons, then there would be eleven additional seats—one between each of the passengers. These seats C are arranged to slide under the ordinary seats when not required for use, so as to be out of the way, and can be readily adjusted when required for use.

In Fig. 2 I have shown the ordinary seat provided on its under side with cleats $g$ for the additional seat C to slide upon. The seat when drawn out is supported by means of two bars D D, connected together by a rule-joint $f$ and pivoted at one end $d$ to a lug on the under side of the seat C and at its other end $e$ to a lug on the floor of the car, so that when the seat is required for use it has simply to be drawn out, as shown in full lines, and when it is desired to push the seat back the joint $f$ is broken, when the seat can be pushed back and the bars D will assume the position shown in dotted lines. Each additional seat is independent of the other, so that one only or all of them may be used, as desired.

It will be seen by Fig. 1 that the seats C are of less width at their rear ends than at the front. By this construction sufficient space is obtained between the seats C C for the knees of the passengers sitting upon the seat B; also, that a car adapted to seat twenty-four persons when fitted with my invention will seat forty-six persons, thereby preventing the necessity of any one standing up.

What I claim as my invention is—

1. In combination with an ordinary car-seat, an additional seat adapted to slide beneath the car-seat and a bar pivoted at its upper end to a lug on the under side of the seat and at its lower end to a lug on the floor of the car, said bar having a rule-joint so as to keep the bar rigid when the additional seat is in use, but which joint can be readily broken when it is desired to push the additional seat out of the way, substantially as shown and described.

2. In combination with the ordinary seat of the street-car, the seat C, adapted to slide upon cleats $g$, secured to the under side of the seat, and the bar D, pivoted at its lower end to a lug on the floor of the car and at its upper end to a lug at or about the center of the seat C, said bar D having a rule-joint $f$, which when the seat is drawn out will rigidly support the same, but which joint can be readily broken when the seat is to be pushed back, substantially as shown and described.

In testimony whereof I have signed my name to this specification, in the presence of two subscribing witnesses, on this 15th day of December, A. D. 1888.

HOSEA W. LIBBEY.

Witnesses:
   CHAS. STEERE,
   EDWIN PLANTA.